United States Patent Office 3,181,930
Patented May 4, 1965

3,181,930
PROCESS FOR PRODUCING ANHYDROUS
AMMONIUM CARNALLITE
Orrie C. Olsen, Baton Rouge, La., assignor to Kaiser
Aluminum & Chemical Corporation, Oakland, Calif.,
a corporation of Delaware
No Drawing. Filed Sept. 17, 1962, Ser. No. 224,222
17 Claims. (Cl. 23—91)

This invention relates to the production of anhydrous ammonium carnallite or ammonium magnesium chloride; and as a further feature it relates to producing substantially anhydrous magnesium chloride of high purity, and suitable, in particular, for electrolysis to produce magnesium metal and chlorine gas.

Many processes for producing anhydrous magnesium chloride have been proposed in the past, including such production by way of decomposition of ammonium carnallite, but the art had not yet solved the problems of producing such anhydrous product in good yield and without formation of substantial amounts of undesired side-products. For instance, in the known heating of ammonium carnallite by direct contact with hot gases or by heat transfer through the metal wall of a container, corrosion of the equipment and ammonia losses are serious problems. It has been previously proposed to overcome some of the prior art disadvantage by methods employing a slow rate of heating, or an HCl sweep gas, or both, but these are expensive and not very successful expedients. There have also been proposed and used numerous other processes for making anhydrous magnesium chloride, but these have either yielded products containing significant amounts of water or magensium oxide or both, or have had other disadvantages, such as high cost and the necessity for very careful control of operating conditions. Furthermore, the processes presently in use for making magnesium metal by electrolysis include using partially dehydrated magnesium chloride as feed to the electrolysis cell. Upon electrolysis in the cells producing magnesium metal, partly dehydrated magnesium chloride, for instance, yields chlorine gas and hydrochloric acid in approximately equal molar concentrations. The chlorine is converted to hydrochloric acid, and the whole of the hydrochloric acid is used for the production of further amounts of magnesium chloride for feed to the cells. In other words, the sole marketed product of the prior art processes of this type is magnesium metal, because recovery of pure chlorine from the wet chrorine-HCl mixture so produced is too expensive for practical operation of such processes. In the conventional anhydrous process, chlorine liberated plus makeup chlorine is used to chlorinate MgO to make the cell feed.

According to the present invention, there is provided a process which yields anhydrous ammonium carnallite and, further, anhydrous magnesium chloride in an inexpensive and efficient manner. The magnesium chloride so produced is of very high purity and is low in magnesium oxide impurity. The present process also provides marketable chlorine gas as one product from magnesium electrolysis cells, as well as magnesium metal.

According to the present invention, dehydrated ammonium carnallite or ammonium magnesium chloride is produced by partial pressure distillation effected by heating the finely divided, hydrated salt, or ammonium carnallite, in a first heating step, in a slurry in water-immiscible, partially vaporizable, organic liquid to drive off part of the water of hydration, the ammonium carnallite remaining in solid particulate state, and being heated in this step to a temperature less than at which it melts and coalesces into dense agglomerates. In this heating step, at least about 25% of the water of hydration is removed. The salt is maintained in finely divided particulate form or in the form of loosely-bonded aggregates. In a second heating step, the temperature of the slurry is increased to remove remaining water of hydration and produce dehydrated ammonium carnallite containing not over about 5% water, in slurry in such liquid. In the first stage of heating, the solid salt may melt or fuse slightly and form into loosely-agglomerated balls or the like, but will remain in such state that it will disperse well, in small particles, upon vigorous agitation. It is to be understood that heating is suitably carried out with agitation in order to effect complete removal of water or other component without substantial coalescence of the salt.

In a preferred embodiment, the finely divided ammonium carnallite starting material in a slurry in liquid hydrocarbon is heated at a temperature of not over about 180° C. until from 42% to 58% of its water of hydration, or combined water, is removed; and the partially dehydrated material is then heated at above 180° C. and not over the temperature at which substantial evolution of ammonia or ammonium chloride occurs, e.g., about 240° C., to remove remaining combined water and produce dehydrated ammonium carnallite. At this stage not over about 5% of the total $NH_3$ content is volatilized off. For best efficiency, however, the dehydrated carnallite is separated from the first-mentioned liquid as a heavy slurry and is mixed with a second water-immiscible liquid, having higher boiling point than the first liquid, prior to the second heating step. In this manner, the second slurry is then heated at the desired temperature with less distillation of the slurrying liquid and with consequent reduction in the amount of such liquid distilled, e.g., for recovery in a continuous process where recycling is practiced.

To prevent coalescence and balling more efficiently, one dehydration process comprises gradually increasing the temperature of the salt-hydrocarbon liquid slurry, with removal of water by distillation in a plurality of successive stages, which can, if desired, be carried out by batch distillation without reflux. By this method, employing gradual increase of temperature, substantially no fusion or coalescence occurs and the product is recovered in the form of very small particles or very small aggregates of particles. Such a method can be carried out in a sieve plate tower, wherein the salt-liquid slurry flows downwardly over sieve plates of the known type, in a heated environment, and the liquid vaporizes off, with recovery at the bottom of a tower, or other device, of finely divided, substantially anhydrous salt.

As another feature of the invention, dehydrated carnallite in finely divided form in a slurry in a water-immiscible, partially vaporizable, organic liquid, is heated to remove ammonium chloride and to leave as a residue in the slurry substantially anhydrous magnesium chloride. The anhydrous ammonium carnallite is heated in a slurry of water-immiscible, organic liquid, preferably at a temperature of from about 350° C. to about 420° C., to drive off ammonium chloride and produce anhydrous magnesium chloride of high purity and low content of impurity such as magnesium oxide or hydroxychloride. The temperature of heating in this stage, in a preferred operation, varies with the vapor pressure of the liquid employed and with the pressure at which heating is carried out, but, in any event, decomposition is found to be effected at a temperature below that at which ammonia and hydrogen chloride are separately driven off. In other words, by carrying out this heating step by partial pressure distillation in a liquid slurry as described, ammonium chloride is driven off, as such, without substantial degradation, e.g., to $N_2$ and $H_2$, and is readily recovered from the vapors issuing from the heating zone. Also, corrosion of the equipment employed is minimized.

There can be employed as a starting material in the present process hydrated ammonium carnallite from any source. One suitable material is ammonium carnallite obtained as a precipitate from natural brines or salt solutions containing various metal chlorides, including magnesium chloride. In order to separate the magnesium values, such a solution is partially evaporated in the known way to remove certain constituents. The concentrated $MgCl_2$ solution is then treated with ammonium chloride, which reacts with the magnesium chloride and forms hydrated ammonium carnallite, $$MgCl_2 \cdot NH_4Cl \cdot 6H_2O$$

This material precipitates and is separated from the mother liquor and is washed. It is in finely divided form and adapted for slurrying with a suitable water-immiscible liquid, such as a liquid hydrocarbon. Upon dehydration, the precipitate loses whatever free water may be admixed with it, and the water of hydration is driven off, and there is recovered a product having substantially the formula, $MgCl_2 \cdot NH_4Cl$. Other types of ammonium carnallite than that precipitated from naturally occurring solutions of magnesium chloride can be employed as a starting material, and such carnallite is also made into a suitable slurry, in finely divided form. For ease of slurrying and speed of reaction it is preferred that the ammonium carnallite be of such size as to pass through 20 mesh screen and be retained on inch or micron 100 mesh, i.e., be of not over 833 microns and not less than 147 microns diameter, but other particle sizes can be employed, if desired. The product, after dehydration, according to this invention, has a water content of less than 0.5% and is recovered in excellent yield.

The water-immiscible organic liquid which is used is preferably a liquid hydrocarbon, for example, kerosene, benzene, toluene, light mineral oil, chlorinated hydrocarbon, aircraft engine oil, a petroleum fraction known as Varsol B, or the like. A preferred liquid vehicle for the first stage heating is a liquid hydrocarbon which is a petroleum hydrocarbon and which has a boiling range of from about 160° C. to 80% distillation at about 238° C., known as Varsol B and produced by Humble Oil and Refining Company, Houston, Texas. In the second stage of heating, there is employed a water-immiscible liquid of higher boiling range and partially vaporizable in this stage, for instance, a mixture consisting of Varsol B and aircraft engine oil in equal proportions with each other. The above-mentioned liquids are useful in carrying out the dehydration procedure and also in decomposing the carnallite to form anhydrous magnesium chloride, being employed in each stage in suitable boiling ranges as described herein. If desired, admixtures of such organic liquids can be employed in any or all stages of the operation, e.g., such mixture consisting of equal proportions of Varsol B (a petroleum naphtha) and Primol 355 (an aircraft engine oil also produced by Humble Oil and Refining Company).

In carrying out the process of the present invention, hydrated ammonium carnallite in finely divided form is admixed with the water-immiscible liquid as described above to form a slurry, and the slurry is heated to a temperature below that at which the hydrated compound melts and coalesces into dense, hard aggregates, preferably not exceeding 180° C., until at least sufficient water is driven off that the partially dehydrated salt does not coalesce to form dense, hard balls or to a sticky mass upon further increase of temperature. In practice, preferably at least 50% of the water of hydration is driven off in this first stage of heating. Very good results have been obtained by heating precipitated ammonium carnallite in a slurry in Varsol B at about 178° to 180° C. with agitation, to attain this partial dehydration. It has been found that a suitable slurry contains from 3 to 10 ml. of liquid to 1 gram part by weight of $$NH_4Cl \cdot MgCl_2 \cdot 6H_2O$$

In a preferred operation, the finely divided hydrated salt is admixed with a small amount of the liquid hydrocarbon to form a thick slurry and this is then added to the remainder of the liquid hydrocarbon which has been heated to its initial vaporization temperature in a suitable container. The vapors evolved during this heating step are removed from the heating zone. These vapors comprise an admixture of water vapor and the vapor of the organic liquid which is employed and traces of $NH_3$ and HCl, and they are taken off and condensed, to recover the organic liquid, such as Varsol B, which can then be recycled to the process, if desired.

After the first stage of heating has been completed, as described above, the slurry of partially dehydrated ammonium carnallite in the liquid is then preferably heated to a higher temperature, e.g., above 180° C. to less than 240° C., to accelerate removal of the remaining water of hydration. In the second heating step, such remaining water is distilled off along with part of the liquid when partial pressure distillation is practiced, for instance, in using the water-immiscible liquid as described herein, which has a boiling range of from about 220° C. to about 280° C. If desired, the partially dehydrated carnallite can be separately recovered from the first slurry, out of contact with air and water, and reslurried in a second water-immiscible organic liquid of different composition from the first liquid and then heated. However, for most economical operation, the slurry from the first heating stage is simply thickened and transferred to the second stage, and admixed with second stage liquid. By the second heating step, the ammonium carnallite is obtained in substantially dehydrated or anhydrous form; that is, it contains less than 5% water, and in some operations less than 1% thereof. The temperature in the second heating stage is maintained below that at which substantial evolution of ammonium chloride or of ammonia and hydrogen chloride is observed in producing dehydrated ammonium carnallite. In this stage of heating, it is particularly desirable to dehydrate without breakdown of the ammonium carnallite itself in order to prevent hydrolysis of magnesium chloride formed, with production of appreciable amounts of a hydrolysis product, such as $Mg(OH)Cl$.

When dehydration of the ammonium carnallite has been effected to the desired extent, i.e., to substantial completion, the product is then, if desired, heated to decompose the same, forming magnesium chloride, which remains as a residue in slurry in the liquid, and ammonium chloride which goes off as a vapor, along with vapors of the liquid employed. This heating step is also carried out by forming a slurry of the finely divided dehydrated carnallite in a water-immiscible liquid as described herein. For instance, there can be advantageously employed a mixture of Varsol B and Primol 355, in which slurry good evolution of ammonium chloride is obtained at 385° C. The dehydrated carnallite is recovered from such slurry out of contact with air and water, and is reslurried in a water-immiscible liquid of higher boiling point.

In carrying out the decomposition heating, partial pressure distillation is very advantageous because decomposition with vaporization of ammonium chloride occurs at a temperature below the boiling point of the liquid vehicle employed and also below the normal decomposition temperature of the carnallite. Furthermore, the ammonium chloride per se is readily condensed and recovered from the vapors issuing and removed from the heating zone; and for most economical operation in one process the recovered ammonium chloride is recycled to the magnesium chloride liquor to form fresh amounts of ammonium carnallite starting material. The magnesium chloride which remains in the slurry is separately recovered therefrom by any desired method, e.g., filtering, centrifuging, or other. It is of very high purity and is especially suitable as feed to an electrolysis cell wherein magnesium metal and chlorine gas are produced in the known electrolytic process. If desired, the anhydrous magnesium chloride can be washed with a light hydrocarbon solvent to remove residual liquid and maintained out of contact with air, moisture or water vapor, prior to introduction into the electrolysis cell. The ammonium chloride is recovered from the vapors issuing from the decomposition zone in any desired manner. It can be suitably recovered by passing the vapors through a scrubber where they are sprayed with water or $MgCl_2$ solution to remove the $NH_4Cl$, which is used to form fresh amounts of hydrous ammonium carnallite feed.

It is an advantage of the present invention that hydrous or hydrated ammonium carnallite is readily dehydrated in two heating steps to produce a substantially anhydrous product, substantially without hydrolysis or loss of material. It is also an advantage that the process can be carried out without substantial corrosion of the equipment. It is especially advantageous that partial pressure distillation enables operation at lower temperatures, avoiding degration of $NH_3$ to $N_2+H_2$. Also, the higher purity $MgCl_2$ produced by the present process minimizes sludging in the cells when used for the electrolytic production of Mg metal. Furthermore, the reactions in the present invention proceed very rapidly and require vaporization of only nominal or minimal amounts of the slurrying liquid or liquids. It is a great advantage that magnesium chloride produced by the decomposition of the anhydrous carnallite is substantially free of MgO and water and that it can be electrolyzed to form magnesium metal and marketable chlorine, while the ammonium chloride recovered from the decomposition step can be utilized to form fresh ammonium carnallite feed.

The following example will demonstrate one mode of carrying out the method of the present invention:

EXAMPLE 1

51.5 grams of hydrated, precipitated and centrifuged ammonium carnallite, $NH_4Cl \cdot MgCl_2 \cdot 6H_2O$, containing 2.5% free water, of particle size passing 20 and retained on 100 mesh is thoroughly mixed with 500 mls. of Varsol B, and the whole is agitated and heated in a distillation apparatus, as shown below. As distillation proceeds, the temperature of the mixture is now increased to 221° C., beyond which no measurable amount of water is recovered.

Table I

| Temperature, °C. | Elapsed time (minutes) | Liquid hydrocarbon vaporized (cumulative), ml. | Water vaporized (cumulative), moles |
|---|---|---|---|
| 119 | 0 | First drop | |
| 159 | 17.7 | 1.2 | Trace. |
| 169 | 26.2 | 11.7 | Free water, +0.23. |
| 170 | 30.1 | 21.6 | 0.68. |
| 175 | 38.6 | 43.0 | 1.80. |
| 176 | 44.2 | 64.2 | 2.96. |
| 195 | 57.7 | 86.2 | 3.87. |
| 208 | 68.5 | 110.2 | 4.18. |
| 209 | 72.8 | 133.8 | 4.61. |
| 210 | 77.7 | 157.8 | 4.92. |
| 212 | 83.0 | 181.6 | 5.29. |
| 214 | 88.6 | 206.0 | 5.49. |
| 216 | 94.5 | 229.8 | 5.86. |
| 221 | 101.0 | 254.3 | 6.0(22.4 ml.). |
| 235 | 109.0 | 279.3 | 6.0. |

Liquid hydrocarbon/water ratio 254.3 mls./22.4=11.35.

The product, upon analysis, exhibits a composition of $1MgCl_2 \cdot 0.868NH_4Cl \cdot 0.089NH_3$, indicating a loss of about 4.3% of ammonia and 13.2% of hydrogen chloride.

The product dissolves in water to form a substantially clear solution which also indicates freedom from any $MgCl_2$ hydrolysis product, such as Mg(OH)Cl.

EXAMPLE 2

In this series a three-stage dehydration, and one-stage decomposition, or a four-stage process is used.

Conditions at each stage and the results obtained are listed as follows:

FIRST STAGE.—500 ML. VARSOL B, 100 GMS. AMMONIUM CARNALLITE $NH_4Cl \cdot MgCl_2 \cdot 6H_2O$, CENTRIFUGE CAKE AT 2.5% FREE WATER

| Temperature (°C.) | Elapsed time (minutes) | Liquid hydrocarbon vaporized (cumulative), ml. | Water vaporifed (cumulative), ml. |
|---|---|---|---|
| 158 | 0 | First drop | |
| 169 | Began adding cake | | |
| 169 | 15.5 | 22.8 | 2.2 |
| 169 | 30.0 | 44.0 | 6.0 |

CAKE ADDITION COMPLETE

| 170 | 64.0 | 64.0 | 11.0 |
| 170 | 88.0 | 71.5 | 13.5 |

Liquid hydrocarbon/water ratio 71.5/13.5=5.3.

Product analysis: $1.0MgCl_2 \cdot 1.0NH_4Cl \cdot 4.39H_2O$. Soft balls formed with about 50% fines.

SECOND STAGE.—PRODUCT FROM FIRST STAGE, FILTERED AND THE FILTER CAKE ADMIXED WITH 500 ML. VARSOL B (DISTILLED)[1]

| Temperature (°C.) | Elapsed time (minutes) | Liquid hydrocarbon vaporized (cumulative), ml. | Water vaporized (cumulative), ml. |
|---|---|---|---|
| 195[1] | 0 | 0 | |

STARTED ADDING CAKE

| 195 | 15.7 | 24.8 | 0.2 |
| 195 | 18.2 | 45.6 | 0.4 |
| 195 | 20.8 | 69.4 | 1.6 |
| 195 | 22.6 | 89.2 | 2.8 |
| 195 | 24.9 | 112.7 | 4.3 |

CAKE ADDITION COMPLETE

| 193 | 27.0 | 132.0 | 6.0 |
| 196 | 31.6 | 154.5 | 8.5 |
| 195 | 49.9 | 167.5 | 10.5 |

Liquid hydrocarbon/water ratio 167.5/10.5=16.0.

[1] Low boiling fraction has been distilled off below this temperature (195° C.).

Product analysis:

$$1.0MgCl_2 \cdot 0.996NH_4Cl \cdot 0.004NH_3 \cdot 2.6H_2O$$

Fine granular product with no fines.

THIRD STAGE.—PRODUCT FROM SECOND STAGE: 250 ML. VARSOL B, 250 ML. PRIMOL 355

| Temperature (°C.) | Elapsed time (minutes) | Liquid hydrocarbon vaporized (cumulative), ml. | Water vaporized (cumulative), ml. |
|---|---|---|---|
| 245 | Started adding cake | 0 | 0 |
| 245 | 10.2 | 23.8 | 1.2 |
| 244 | 11.8 | 44.7 | 1.3 |
| 245 | 15.1 | 68.9 | 2.1 |
| 244 | 17.1 | 89.3 | 2.7 |
| 244 | 19.5 | 113.3 | 3.7 |
| 245 | 22.2 | 133.1 | 4.9 |
| 244 | 25.4 | 155.6 | 7.4 |
| 246 | 88.7 | 173.8 | 10.2 |
| 245 | 96.8 | 181.1 | 11.4 |

Liquid hydrocarbon/water ratio 181.1/11.4=15.9.

Product analysis: $1.0MgCl_2 \cdot 0.891NH_4Cl \cdot 0.07NH_3$. All granular—no fines.

FOURTH STAGE.—PRODUCT FROM STAGE THREE: 350 ML. PRIMOL 355 (70%), 150 ML. VARSOL B (30%)

| Temperature (° C.) | Elapsed time (minutes) | Liquid hydrocarbon vaporized (cumulative), ml. |
| --- | --- | --- |
| 270 | 11.1 | 25 |
| 379 | 50.6 | 146 |

STARTED ADDING CAKE

| | | |
| --- | --- | --- |
| 384 | 56.4 | 171 |
| 383 | 61.1 | 192 |

CAKE ADDITION COMPLETE

| | | |
| --- | --- | --- |
| 385 | 69.1 | 217 |
| 384 | 77.2 | ¹ 238 |
| 384 | 89.4 | 263 |
| 384 | 98.0 | ¹ 284 |
| 384 | 106.6 | 309 |
| 383 | 117.9 | 330 |
| 384 | 129.2 | ¹ 355 |
| 384 | 147.9 | 380 |
| 384 | 152.2 | 387 |

¹ 100 ml. 70% Primol 355 and 30% Varsol B mixture added.
Liquid hydrocarbon/NH₄Cl ratio 216/15.9=13.6.

*Product analysis:*

1.0MgCl$_2$·0.0172NH$_4$Cl·0.0356NH$_3$·(0.0528 total NH$_3$)

Fine granular product.

Soft balls are formed in the first stage which are broken down in the second stage. A granular product comes off the fourth stage.

Ammonia loss from the first two stages is zero, and the chloride loss is negligible. The ammonia loss from the third stage is appreciable and the chloride loss is significantly higher indicating decomposition reaction has also begun in the third stage.

It will be understood that this method can be carried out in either batch or continuous operations. In batch operations it is advantageous to heat without refluxing to effect increase of temperature to completely dehydrate, and subsequently decompose the MgNH$_4$Cl$_3$. In a continuous multistage operation, keeping vapors from each stage separate is advantageous to remove water, e.g., by condensation, and to recover and recycle organic liquid, and refluxing is advantageous to maintain the desired temperature at each stage. As described above, the ammonium chloride component is recovered from vapors issuing from the decomposition zone for reuse in the process, as desired. In carrying out either the dehydration procedure or the decomposition procedure, the temperatures and times of heating can be varied as desired within the limits indicated for each stage of heating. That is, a higher temperature can be employed for a shorter time or a lower temperature for a longer time; the higher the temperature in each stage, the lower the "oil"-volatile component ratio (oil being the liquid vehicle).

By the term "dehydrated carnallite" or "dehydrated ammonium carnallite" as used herein, it is intended to mean such carnallite containing not over about 5% water, and the carnallite preferably contains less than 1% water, and in some instances the product contains less than 0.5% water. It is also to be understood that the first or primary heating stage removes all free water present in the particulate solids mass, as well as the proportion of combined water described herein. The temperatures given herein are at atmospheric pressure unless otherwise indicated. Percentages and parts given herein are by weight, except where otherwise indicated. In the various heating steps, the partial pressure distillation can be carried out at atmospheric or other pressures, for instance, vacuum can be employed. Agitation is effected in any desired manner, e.g., mechanically, or, in a sieve plate process, by passage or bubbling of hot gases therethrough.

The liquid hydrocarbons, Varsol B and Primol 355 (an aircraft engine oil), specifically mentioned above, are available in commerce as produced by Humble Oil and Refining Company, and are petroleum fractions. The typical distillation range of Varsol B is as follows: Begins at 160° C., 10% distilled at 196° C., 20% at 204° C., 30% at 210° C., 40% at 218° C., 50% at 221° C., 60% at 226° C., 70% at 232° C., and 80% at 238° C. Typical characteristics of Primol 355 are: SSU viscosity at 100° F. is 360, and at 210° F. is 53.8; specific gravity at 60° F. is 0.886; Saybolt color is +30; flash point (PM) at 400° F. and pour point at −30° F.; and distillation range is from 700° F. (371° C.) to 940° F. (504° C.).

The mesh sizes shown herein are of Tyler screens as defined in Chemical Engineers Handbook, John H. Perry, editor-in-chief, 2nd edition, 1941, McGraw-Hill Book Company, page 1719.

In the above description, the dehydration process has been described as proceeding in at least two stages in the first of which at least 25% of the combined water or water of hydration is removed at a temperature of not over 180° C., and in the second, heating is continued at a higher temperature to remove remaining water of hydration but without substantial evolution of gaseous ammonia and HCl or ammonium chloride. It is to be understood that each of these stages can alternatively be broken down into several smaller stages or to gradual increase of temperature, with removal of 25% of water of hydration at not over 180° C., and thereafter further increase of temperature as described. It is also to be understood that the water-immiscible liquid employed is partially vaporizable under the conditions of each stage of heating to provide partial pressure distillation. In the sieve plate counterflow method mentioned herein, the ammonium carnallite particles are finely divided and well dispersed in a liquid vehicle as described herein, and dehydration proceeds stepwise as the slurry trickles downwardly, e.g., through a tower, and the temperature thereof is gradually increased, by hot gases passing upwardly.

In the second stage of heating, i.e., whereby the remaining water is driven off, it is suitable to employ a liquid hydrocarbon consisting essentially of an admixture of from 0% to 50% aircraft engine oil (Primol 355) and from 50% to 100% Varsol B, wherein the 100% Varsol B is preferably a stripped product having a boiling range of from about 195° C. to 80% distilled at 238° C.; and in the third stage, i.e., where ammonium chloride is driven off, good results are obtained by using a liquid hydrocarbon consisting essentially of from 75% to 100% of such aircraft engine oil and from 0% to 25% Varsol B. These ratios are in percent by volume. It is desirable to maintain the hot "oil"-slurry product from each stage out of contact with air; and to maintain the dehydrated or partially dehydrated carnallite and anhydrous magnesium chloride out of contact with water to prevent rehydration and the hydrocarbon coating assists in such protection for the carnallite and anhydrous magnesium chloride. In the above description, "SSU" is the well-known abbreviation for "Saybolt Seconds Universal," a standard viscosity method, and "PM" indicates the "Pensky-Martens" flash point determination.

Having now described the invention, what is claimed is:

1. Method for producing anhydrous ammonium carnallite which comprises forming a slurry of hydrated ammonium carnallite in a water-immiscible organic liquid partially vaporizable at the temperature of operation, heating and agitating said slurry to a temperature below that at which said carnallite melts and coalesces, continuing said heating and agitation until at least about 25% of the combined water is removed from said carnallite, then heating said partially dehydrated carnallite at a still higher temperature but below the temperature at which ammonia and hydrogen chloride are substantially evolved to remove the remainder of said combined water and produce a dehydrated ammonium carnallite containing not over about 5% water, in said last-mentioned heating step said partially dehydrated carnallite being in slurry in a water-immiscible liquid partially vaporizable at the temperature of heating.

2. Method of preparing dehydrated ammonium carnallite which comprises forming a slurry of finely divided hydrated ammonium carnallite in a water-immiscible organic liquid partially vaporizable at the temperature of operation, heating and agitating said slurry at a temperature of not over 180° C. to remove at least 25% of the combined water, and then heating said partially dehydrated slurry at a temperature above 180° C. to remove remaining water of hydration and to form a dehydrated ammonium carnallite containing not over about 5% water.

3. Method as in claim 2 wherein said water-immiscible liquid is a petroleum fraction having a boiling range of from 160° C. to 80% distillation at 238° C.

4. Method as in claim 2 wherein said partially dehydrated slurry is heated at a temperature of from 180° C. to 240° C.

5. Method of preparing dehydrated ammonium carnallite which comprises forming a slurry of finely divided, hydrated ammonium carnallite and Varsol B, heating and agitating said slurry at a temperature of not over 180° C. to remove from 42% to 58% of the combined water from said carnallite, forming a slurry of said partially dehydrated carnallite with a liquid hydrocarbon of higher boiling range and partially vaporizable at the temperature of operation, heating said slurry to remove remaining combined water without substantial evolution of ammonium chloride, and separately recovering dehydrated ammonium carnallite containing not over about 5% water.

6. Method for producing anhydrous magnesium chloride which comprises forming a slurry of hydrated ammonium carnallite in a water-immiscible organic liquid partially vaporizable at the temperature of operation, heating said slurry at a temperature below that at which said ammonium carnallite melts and coalesces and for a time sufficient to remove at least 25% of the combined water from said carnallite, then heating said slurry at an increased temperature to remove remaining combined water and form an ammonium carnallite containing not over about 5% water, then heating said slurry of dehydrated carnallite to drive off ammonium chloride, and separately recovering anhydrous magnesium chloride of high purity.

7. Method as in claim 6 wherein said liquid is a liquid hydrocarbon.

8. Method as in claim 6 wherein said slurry is first heated to a temperature not over 180° C.

9. Method for producing anhydrous magnesium chloride which comprises forming a slurry of finely divided ammonium carnallite in a liquid hydrocarbon partially vaporizable at the temperature of operation, heating said slurry at a temperature of not over 180° C. to remove at least 25% of the combined water from said carnallite, then heating said partially dehydrated carnallite at a temperature above 180° C. to remove the remainder of said combined water and form an ammonium carnallite containing not over about 5% water, separating said dehydrated carnallite from said liquid hydrocarbon out of contact with air and water, slurrying said separated dehydrated carnallite in a second liquid hydrocarbon of higher boiling range and partially vaporizable at the temperature of operation, and heating said second slurry to drive off ammonium chloride, and separately recovering anhydrous magnesium chloride from said second slurry.

10. Method as in claim 9 wherein said slurry is heated at a temperature of from 180° C. to 240° C. to remove said remainder of the combined water.

11. Method as in claim 9 wherein said slurry is heated at from 350° C. to 420° C. to drive off said ammonium chloride.

12. Method as in claim 9 wherein said first liquid hydrocarbon is Varsol B.

13. Method as in claim 9 wherein said second liquid hydrocarbon consists essentially of an admixture of from 50 to 100% Varsol B and from 0 to 50% aircraft engine oil.

14. Method for producing anhydrous magnesium chloride which comprises forming a slurry of hydrated ammonium carnallite in liquid hydrocarbon, said carnallite being of a particle size passing 20 mesh and retained on 100 mesh, said liquid being partially vaporizable at the temperature of operation, heating said slurry in a first heating step at a temperature not exceeding 180° C. to remove 42% to 58% of the combined water from said carnallite, then heating said slurry of partially dehydrated carnallite in a second heating step at a temperature of from about 180° C. to about 240° C. to remove remaining combined water and form a dehydrated ammonium carnallite containing not over about 1% water, separately recovering said dehydrated carnallite out of contact with air and water, reslurrying said dehydrated carnallite in a second liquid hydrocarbon of higher boiling range than said first mentioned hydrocarbon and partially vaporizable at the temperature of operation, heating said second slurry to drive off ammonium chloride, and separately recovering anhydrous magnesium chloride.

15. Method as in claim 14 wherein said first liquid hydrocarbon is Varsol B.

16. Method as in claim 14 wherein said second liquid hydrocarbon is an admixture of from 50% to 100% Varsol B and from 0% to 50% aircraft engine oil.

17. Method for producing anhydrous magnesium chloride which comprises forming a slurry of precipitated ammonium carnallite hexahydrate in Varsol B, heating said slurry in a first heating step at a temperature of not over 180° C. to remove from 42% to 58% of the water of hydration from said carnallite, separately recovering said partially dehydrated carnallite out of contact with air and water, forming a second slurry of said recovered carnallite in a second liquid hydrocarbon consisting essentially of 50% Varsol B and 50% aircraft engine oil, heating said second slurry at from 180° C. to 240° C. to remove remaining water of hydration and form dehydrated carnallite containing not over 1% water, separately recovering said dehydrated carnallite out of contact with air and water, from a third slurry of said dehydrated carnallite in a mixture consisting essentially of 70% aircraft engine oil and 30% Varsol B, heating said third slurry at from 350° C. to 420° C. to drive off ammonium chloride, and separately recovering a slurry of anhydrous magnesium chloride of high purity.

References Cited by the Examiner

UNITED STATES PATENTS

| | | | |
|---|---|---|---|
| 1,276,499 | 8/18 | Dantsizen | 23—91 |
| 1,301,766 | 4/19 | Wallace | 23—91 |
| 2,165,284 | 7/39 | Madorsky | 23—91 X |

OTHER REFERENCES

Serial No. 292,742, Beck (A.P.C.), published July 13, 1943.

MAURICE A. BRINDISI, *Primary Examiner.*